No. 753,147. PATENTED FEB. 23, 1904.
J. W. LAMBERT.
SPEED CONTROLLING VALVE FOR GAS AND GASOLENE ENGINES.
APPLICATION FILED DEC. 29, 1902.
NO MODEL. 2 SHEETS—SHEET 2.
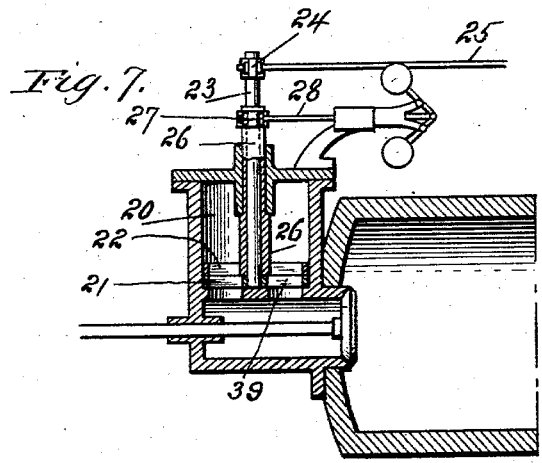
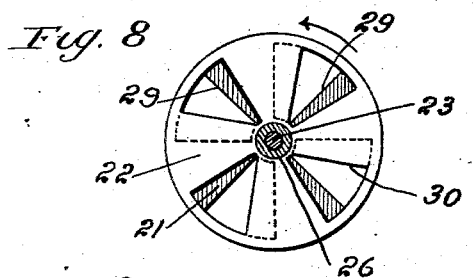
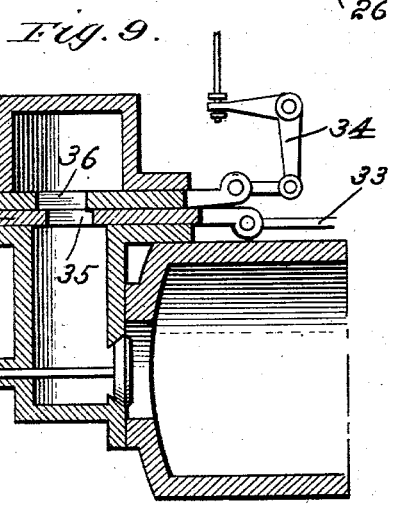
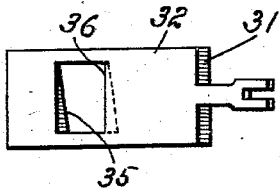
WITNESSES:
INVENTOR
John W. Lambert,
BY
ATTORNEYS.

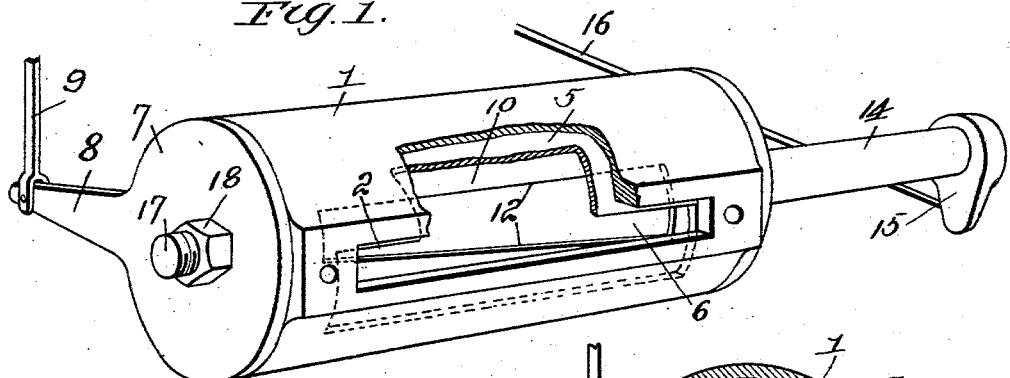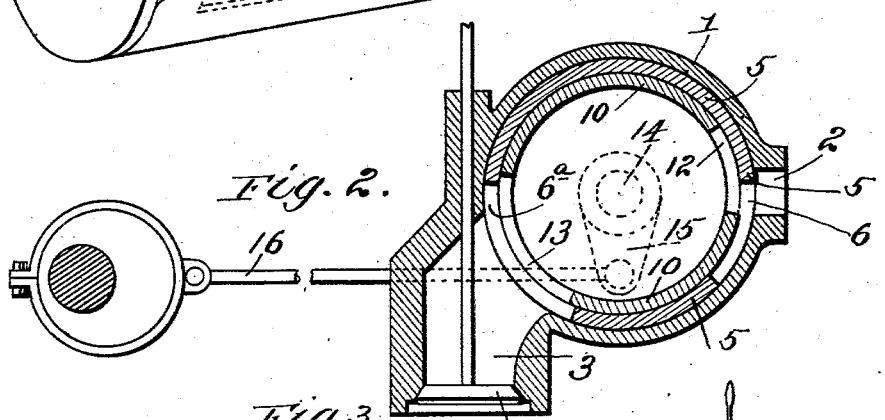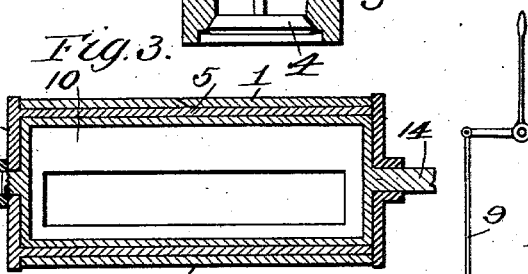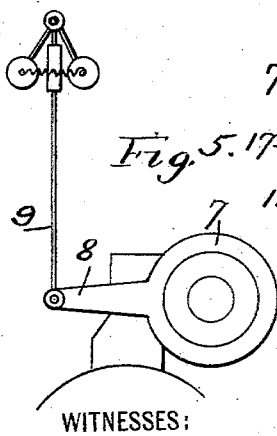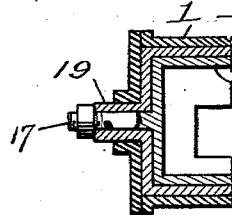

No. 753,147. Patented February 23, 1904.

UNITED STATES PATENT OFFICE.

JOHN W. LAMBERT, OF ANDERSON, INDIANA, ASSIGNOR TO THE BUCKEYE MFG. CO., OF ANDERSON, INDIANA.

SPEED-CONTROLLING VALVE FOR GAS OR GASOLENE ENGINES.

SPECIFICATION forming part of Letters Patent No. 753,147, dated February 23, 1904.

Application filed December 29, 1902. Serial No. 137,010. (No model.)

*To all whom it may concern:*

Be it known that I, JOHN W. LAMBERT, a citizen of the United States, residing at Anderson, in the county of Madison, State of Indiana, have invented certain new and useful Improvements in Speed-Controlling Valves for Gas or Gasolene Engines, of which the following is a specification, reference being had therein to the accompanying drawings, in which—

Figure 1 is a perspective view of the valve, parts being broken away to more clearly show its construction; Fig. 2, a transverse vertical sectional view thereof; Fig. 3, a longitudinal sectional view; Fig. 4, a detail longitudinal sectional view showing a slightly-different construction of valve; Fig. 5, a detail view showing an automatic governor connected to the arm of the regulating-valve; Fig. 6, a similar detail view showing a lever connected to the arm of the regulating-valve; Fig. 7, a longitudinal vertical sectional view showing the regulating-valve composed of rotary-disk valve-plates; Fig. 8, a detail plan view of disk valve-plates; Fig. 9, a view similar to Fig. 7, showing the regulating-valve composed of two reciprocatory valve-plates; and Fig. 10, a detail plan view of the valve-plates.

The main object of this invention is to provide a simple and efficient device by which the charge of explosive mixture to the engine-cylinder may be easily regulated according to the speed desired.

Other and equally-important objects will appear hereinafter.

Referring to the various parts by numerals, 1 designates the outer cylindrical valve-casing, which may be of any suitable length and diameter best suited for the engine to which it is to be attached. This casing is provided with a horizontal longitudinal port 2 for the admission of the explosive mixture from the mixing device and with an outlet-port 3, which is in communication with the engine-cylinder. This outlet-port may be closed by a valve 4, which is suitably timed to admit the charge to the cylinder at the proper point in the stroke of the piston. Within the valve-casing is mounted a cylindrical tubular regulating-valve 5, which is provided with a horizontal elongated port 6, which corresponds to the inlet-port of the valve-casing and is arranged to register with said port and with a port $6^a$, which corresponds to and registers with the outlet-port 3 of the casing. A head 7 is formed on one end of this regulating-valve, which serves as a closure for the valve-casing, and is provided with a laterally-extending arm 8. To the end of this arm is connected a rod 9, whose other end is connected to a regulating device, such as an automatic speed-governor or a lever. When this controlling-valve is applied to stationary engines, the rod 9 will be connected to an automatic speed-governer of any desired form; but when it is applied to engines designed to be used on automobiles it will be connected to a lever.

Within the tubular cylindrical regulating-valve is mounted the cut-off valve 10. This cut-off valve is cylindrical and tubular and is formed with an inlet-port 12, which is located at the proper point, so that it may be brought into register with the inlet-port of the valve-casing. One longitudinal edge of this inlet-port 12 is inclined with respect to the corresponding edge of the inlet-port of the valve-casing—that is, it is arranged to extend diagonally across said port—the other edge of this valve-port being parallel with the longitudinal edges of the inlet-port of the casing. This regulating-valve is also formed with an outlet-port 13, which is arranged to register with the outlet-ports of the valve-casing and regulating-valve.

The cut-off valve is mounted on the inner end of a valve-rod 14, which projects through one end of the valve-casing, and is provided outside of the valve-casing with an arm 15. To the outer end of this arm is connected a rod 16, whose other end is connected to an eccentric-strap mounted on an eccentric carried by the engine-shaft, whereby said rod is reciprocated and the cut-off valve operated to cut off the supply of mixture at the proper moment.

The cut-off valve is provided with a central stud 17, which projects through the head of the regulating-valve, its outer end being threaded to receive a nut 18. By this means the cut-off valve at one of its ends is supported in the head of the regulating-valve and at its other end in the stationary head of the valve-casing. By this means the cut-off valve may be accurately centered within the regulating-valve, and the friction between the two valves will be reduced to a minimum.

It is of course obvious that stationary heads may be provided for both ends of the valve-casing and that the regulating-valve may be provided with a central stud or valve-rod 19, as shown in Fig. 4, and that the arm 8 may be connected to the outer end of said valve-rod. In this form the central stud 17 of the cut-off valve would be projected through a central longitudinal opening in the stud of the regulating-valve, as also shown in Fig. 4 of the drawings.

The purpose of inclining one edge of the port of the cut-off valve is to provide for a gradual restriction of the inclined port, both longitudinally and transversely, and for a corresponding gradual opening of said port.

As shown in Fig. 7, the speed-controlling valve is arranged within the mixer-chamber 20, which chamber is in communication at its lower end with the cylinder of the engine, and consists of two disk valve-plates 21 and 22, the lower one of which, 21, forms a cut-off valve and is at the bottom of the mixer-chamber, the upper one, 22, which forms the regulating-valve, resting on the upper side of the plate 21. Connected to the center of the cut-off valve 21 is a vertical rod 23, whose other end projects above the mixer-chamber and is provided with an arm 24, to which is connected one end of a rod 25, the other end of said rod being connected to an eccentric on the engine-shaft, (not shown in Fig. 7,) similar to the rod 16 of Fig. 2. To the center of the regulating-valve 22 is connected a sleeve 26, which surrounds the rod 23, its upper end projecting above the mixer-chamber and carrying an arm 27. To this arm is connected one end of a rod 28, the other end of which is connected to a suitable speed-governor. In Fig. 7 this governor device is in the form of an automatic governor; but it is obvious that it may be a lever, as in Fig. 6.

In the cut-off-valve disk 21 are formed radial inlet-ports 29, and in the regulating-valve are arranged inlet-ports 30, these latter ports having one edge radial and one edge tangential. The cut-off valve is so connected to the engine-shaft that it will move in the direction indicated by the arrow shown in Fig. 8 to cut off the supply of mixture to the cylinder and in a reverse direction to open the ports to permit the mixture to enter the cylinder. The regulating-valve is so connected to the speed-governor that it will be moved in a direction reverse to the direction indicated by the arrow in Fig. 8 when it is desired to advance the point of cut-off, and thereby reduce the charge to the cylinder.

The purpose of arranging one edge of each port of the regulating-valve tangential is to cause the cut-off valve to gradually restrict the inlet-ports in length as well as in width.

In Fig. 9 the speed-controlling device is composed of two reciprocable valve-plates 31 and 32, which are arranged at the lower end of the mixer-chamber. The lower plate 31 forms the cut-off valve and is connected by a rod 33 to an eccentric on the engine-shaft (not shown) by which the said valve will be reciprocated to cut off the supply of mixture to the cylinder. The upper valve-plate constitutes the regulating-valve and is connected through the bell-crank lever 34 to a suitable speed-governing device. The cut-off valve is provided with a port 35, and the regulating-valve is provided with a port 36. The longitudinal edges of the port of the cut-off valve are inclined with respect to the corresponding edges of the port of the cut-off valve, whereby as said cut-off valve is reciprocated the port in the regulating-valve will be gradually restricted both longitudinally and transversely and will be correspondingly gradually opened.

Having thus described my invention, what I claim as new, and desire to secure by Letters Patent, is—

1. A speed-controlling valve for gas-engines comprising, a valve-casing having a cylindrical interior and provided with an inlet-port and with an outlet-port opposite the inlet-port, a valve controlling the outlet from said casing, a cylindrical regulating-valve within the valve-casing and formed with an inlet-port adapted to register with the inlet-port of the casing and with an outlet-port which is always in communication with the outlet-port of said casing, a cylindrical tubular cut-off valve arranged within the regulating-vave and formed with an inlet-port adapted to register with the inlet-port of the regulating-valve and with an outlet-port always in communication with the outlet-port of the casing, an outward-extending valve-rod connected to the cut-off valve, means connected to said valve-rod for rocking the cut-off valve, a crank-arm connected to the regulating-valve and a governor means connected to said crank-arm whereby said regulating-valve will be actuated by said governor.

2. A speed-controlling valve for gas-engines comprising, a valve-casing having a cylindrical interior provided with an inlet-port and with an outlet-port opposite the inlet-port, a valve controlling the outlet from said casing, a cylindrical regulating-valve within the valve-casing and formed with an inlet-port adapted to register with the inlet-port of the casing, and with an outlet-port which is always in communication with the outlet-port of said casing, one end of said regulating-valve being open and the other end being closed by a head which also forms a closure for one end of the valve-casing, a cylindrical tubular cut-off valve arranged within the regulating-valve and formed with an inlet-port adapted to register with the inlet-port of the regulating-valve and with an outlet-port always in communication with the outlet-port of the casing, both ends of said cut-off valve being closed, an outward-extending valve-rod secured centrally to one end of the cut-off valve, an outward-extending journal secured to the other end of said cut-off valve and projecting through the closed end of the regulating-valve, means connected to the valve-rod for rocking the cut-off valve and a crank-arm connected to the closed head of the regulating-valve, and a governor device connected to said arm.

3. A speed-controlling valve for gas-engines comprising, a valve-casing formed with a large interior chamber and provided with an inlet-port and with an outlet-port in communication with the engine-cylinder, a valve controlling this outlet-port, a reciprocating regulating-valve within the valve-casing and provided with an inlet-port adapted to register with the inlet-port of the casing, a reciprocating cut-off valve within the casing and between the inlet to the cylinder and the inlet to the regulating-valve, means for reciprocating the cut-off valve, and a governor device connected to the regulating-valve, whereby a gas-mixing chamber will be formed between the inlet-port of the cut-off valve and the outlet-port of the valve-casing.

4. A speed-controlling valve for gas-engines comprising, a valve-casing having a cylindrical interior provided with an inlet-port and with an outlet-port opposite the inlet-port, a valve controlling the outlet from said casing, a cylindrical regulating-valve within the valve-casing, and formed with an inlet-port adapted to register with the inlet-port of the casing and with an outlet-port which is always in communication with the outlet-port of said casing, a cylindrical tubular cut-off valve arranged within the regulating-valve and formed with an inlet-port having one longitudinal edge inclined with respect to the adjacent edge of the port in the regulating-valve and adapted to register with the inlet-port of the regulating-valve, and with an outlet-port always in communication with the outlet-port of the casing, an outward-extending valve-rod connected to the cut-off valve, and means connected to said valve-rod for rocking the cut-off valve, a crank-arm connected to the cut-off valve, and a governor means connected to said crank-arm whereby the said cut-off valve will be actuated by said governor.

In testimony whereof I hereunto affix my signature, in the presence of two witnesses, this 26th day of December, 1902.

JOHN W. LAMBERT.

Witnesses:
JAMES F. BOLEN,
E. W. LONGANEEKER.